United States Patent
Yeung

(10) Patent No.: US 6,833,178 B2
(45) Date of Patent: Dec. 21, 2004

(54) MULTILAYER LAMINATED STRUCTURE, IN PARTICULAR FOR WRAPPING ELECTRIC CABLES

(75) Inventor: Chor-Keung Yeung, Chaudenay (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 10/225,867

(22) Filed: Aug. 22, 2002

(65) Prior Publication Data

US 2004/0038038 A1 Feb. 26, 2004

(51) Int. Cl.$^7$ .............................. B32B 3/02; B32B 27/08
(52) U.S. Cl. ..................... 428/189; 428/422; 428/473.5
(58) Field of Search ................................ 428/189, 422, 428/473.5

(56) References Cited

U.S. PATENT DOCUMENTS 3,616,177 A  10/1971  Gumerman ................. 428/216
5,731,088 A * 3/1998 La Court ..................... 428/421

OTHER PUBLICATIONS

Patent Abstract of Japan, vol. 1995, No. 08, JP 07 125067 A, "Production of Cylindrical Structure", May 1995.

* cited by examiner

Primary Examiner—Ramsey Zacharia
(74) Attorney, Agent, or Firm—Schweitzer Cornman Gross & Bondell LLP

(57) ABSTRACT

The present invention provides a multilayer laminated structure comprising a polyimide layer coated on at least one of its faces in FEP, and at least one layer of PTFE bonded to said FEP-coated polyimide layer, said layers being formed by tapes that are bonded together while hot with pressure being applied, the or each PTFE tape being made of green PTFE obtained by lubricated extrusion and being united with the FEP-coated polyimide tape at a temperature that is lower than the sintering temperature of PTFE.

3 Claims, 2 Drawing Sheets

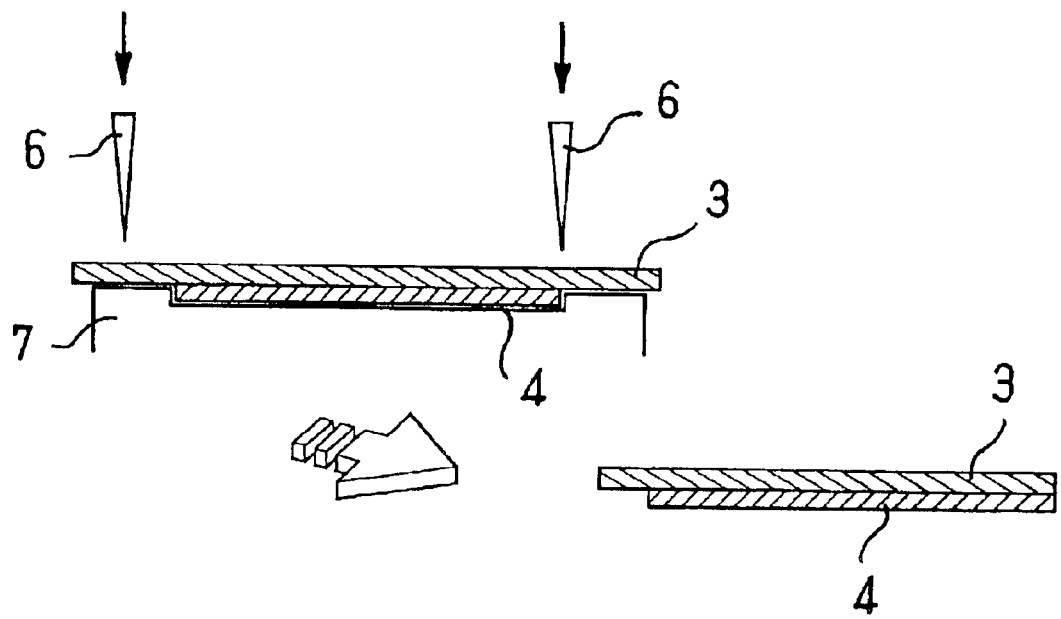
FIG_3
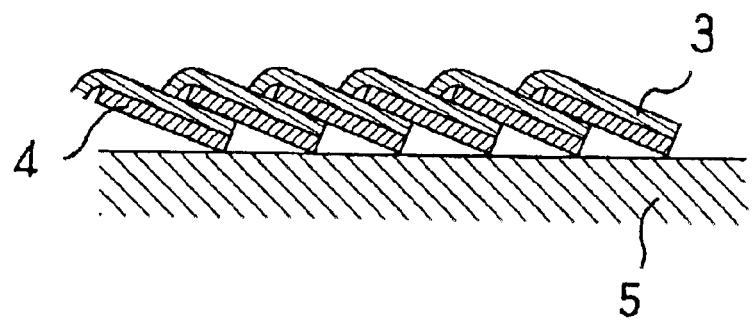
FIG_4

MULTILAYER LAMINATED STRUCTURE, IN PARTICULAR FOR WRAPPING ELECTRIC CABLES

The present invention relates to a multilayer laminated structure suitable for use in particular in wrapping electric cables in order to provide electrical insulation.

A particular application lies in aviation cabling where it is essential to provide very good electrical insulation so as to prevent any propagation of an electric arc.

BACKGROUND OF THE INVENTION

In that type of application, use has been made for many years of multilayer laminated structures implementing a layer of polyimide such as "Kapton" from the supplier E.I. du Pont de Nemours and Co. That material presents good high temperature performance and good electrical insulation performance.

An example of such a multilayer structure is described in that supplier's U.S. Pat. No. 3,616,177. That structure comprises a layer of polyimide coated on at least one of its faces in a layer of fluorinated ethylene propylene (FEP) and a layer of polytetrafluoroethylene (PTFE) bonded to one of said FEP layers. The PTFE layer is applied by being coated in the form of an aqueous dispersion.

The presence of FEP serves to ensure that the polyimide on which it is applied does not absorb external moisture which could lead to it becoming degraded by hydrolysis.

A drawback of such a multilayer structure lies in the fact that the PTFE layer applied by coating an aqueous dispersion presents thickness that is small, providing little strength and little resistance to abrasion.

Unfortunately, when wrapping using modern taping machines that can rotate at speeds in the range 2000 revolutions per minute (rpm) to 3000 rpm, it is necessary to have a structure that can withstand the rate at which taping is performed, and thus a structure in which all of the layers, and in particular the PTFE layer, present sufficient strength to be able to withstand that rate of taping without faults being generated.

OBJECTS AND SUMMARY OF THE INVENTION

The present invention provides a multilayer laminated structure comprising both a polyimide layer coated on at least one of its faces in FEP, and at least one layer of PTFE bonded to said FEP-coated polyimide layer, wherein said layers are constituted by tapes that are bonded together while hot with pressure being applied, the or each PTFE tape being made of green PTFE obtained by lubricated extrusion and being united with the FEP-coated polyimide tape at a temperature that is lower than the sintering temperature of PTFE.

Thus, in the final product, the PTFE is green, and the tapes are united at a temperature which lies in practice in the range 280° C. to 300° C., and which is higher than the melting point of FEP so as to cause the FEP to melt and bond the tape(s) of PTFE to the FEP-coated polyimide tape.

In the invention, the temperature during heating while pressure is being applied is lower than 340° C. which is the sintering (gelling) temperature of PTFE.

Advantageously in the invention, only one tape of PTFE is provided and the width of the PTFE tape is greater than the width of the FEP-coated polyimide tape.

The PTFE tape preferably projects sideways from only one side of the FEP-coated polyimide tape. This makes it possible during taping to provide improved isolation of the FEP-coated polyimide layer, with the projecting margin of the PTFE tape constituting a continuous barrier that protects the polyimide from possible spoiling in an aggressive environment.

The PTFE used in the invention is obtained by lubricated extrusion so a to present a fibrillated structure that is oriented in the longitudinal direction of the resulting tape.

A lubricated extrusion method consists in mixing PTFE powder, together with a filler and/or pigments, if any, and a lubricant so as to provide a compact preform which is subjected to pressure extrusion in which a piston urges the optionally-filled PTFE through a die so as to form an extrusion of constant section, such as a flat tape or a cylindrical rod, the lubricant subsequently being eliminated, generally by heating.

The resulting tape is generally calendared and, where appropriate, it may be subjected to a de-densifying operation by stretching that imparts inter-fibril porosity to the final product.

The tape of the invention may also be of the type that is suitable for being marked by laser, e.g. having the structures described in French patents 92/06427 and 95/03195 in the name of the Applicant company.

BRIEF DESCRIPTION OF THE DRAWINGS

Other advantages and characteristics of the present invention appear on reading the following description of embodiments given with reference to the accompanying drawings, in which:

FIG. 3 is a diagram showing a cutter enabling a structure to be made in a particular implementation; and FIG. 4 is a view analogous to FIG. 2, showing a structure obtained using the cutter of FIG. 3.

MORE DETAILED DESCRIPTION

Figure 1:
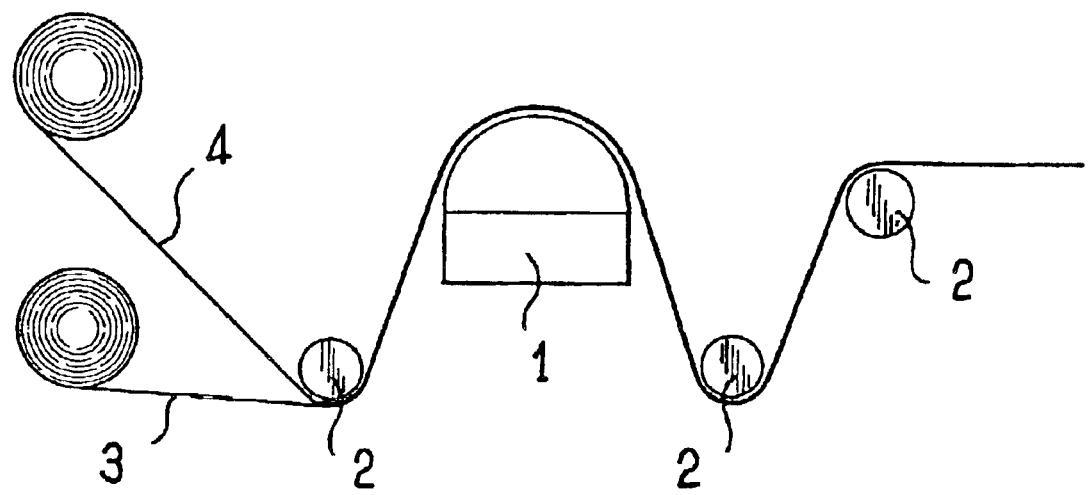
FIG. 1 is a diagrammatic view of an installation for making a multilayer laminated structure of the invention.

The apparatus of FIG. 1 essentially comprises a temperature-regulated support 1 and guide rollers 2 over which a PTFE tape 3 and an FEP-coated polyimide tape 4 are caused to pass in such a manner as to bond them together by applying heat and pressure via the temperature-regulated support.

In a particular embodiment, a green PTFE tape is used that is 30 micrometers ($\mu$m) thick and 70 millimeters (mm) wide as obtained by lubricated extrusion.

The FEP-coated polyimide tape 4 is a tape that is commercially available under the reference Kapton 606 and it too is 70 mm wide and 30 $\mu$m thick.

The temperature of the support is regulated to 310° C. and the applied force for bonding the tapes 3 and 4 together is 30 grams (g).

The stress measured in the PTFE tape 3 is 21.2 megapascals (MPa) in the longitudinal direction (measured using the ASTM/D-882 standard). The stress in the resulting multilayer laminated structure in the longitudinal direction is 128 MPa, thus making it possible in the application to insulating electric cables, to perform wrapping at high speed using modern taping machines operating at speeds of 2000 rpm or even much more.

Figure 2:
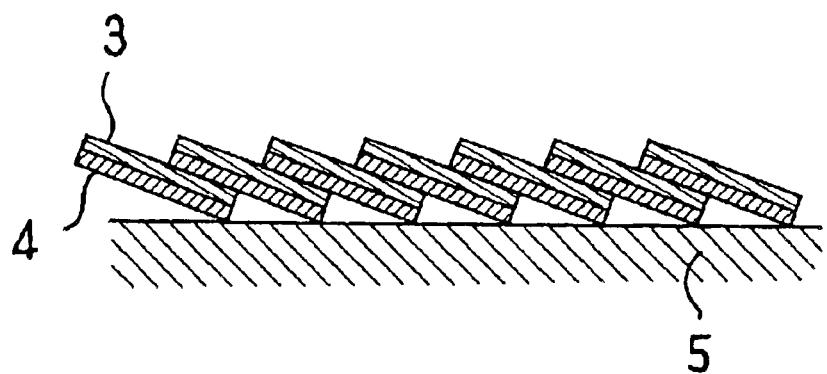
FIG. 2 is a diagram showing a structure obtained using the apparatus of FIG. 1, and wound to form insulation on an electrical conductor.

FIG. 2 shows the multilayer structure obtained in the FIG. 1 apparatus taped onto an electrical conductor 5.

FIG. 3 shows implementation of a variant embodiment of the multilayer laminated structure of the invention in which the width of the PTFE tape in the final structure is greater than that of the FEP-coated polyimide tape.

For this purpose, cutter blades shown diagrammatically at 6 are used to slice a structure of the kind obtained in the FIG. 1 apparatus, and in which, for example, a PTFE tape 3 is used that projects from both sides of the FEP-coated polyimide tape 4 (as shown in the figure), using an anvil 7 having a groove that is of a size suitable for receiving the tape 4.

In the example shown, it can be seen that after the PTFE tape 3 has been sliced it projects from only one side of the FEP-coated polyimide tape, thus making it possible during wrapping to implement the disposition shown in FIG. 4 in which it can be seen that the PTFE tape 3 covers the FEP-coated polyimide tape 4 entirely and protects it completely.

By way of example, a laminated structure has been made in which the PTFE and FEP-coated polyimide tapes have the same characteristics as those mentioned above, the FEP-coated polyimide tape 4 being 57 mm wide.

That laminated structure presented substantially the same ability to withstand traction as in the above-described example.

The invention has also been implemented with a PTFE tape that has been de-densified by stretching after being obtained by lubricated extrusion, the PTFE tape presenting specific gravity of 0.7.

The mechanical characteristics of the resulting laminated structure were of the same order as those in the previously-described example, thus likewise enabling it to be used in high-speed taping machines.

Tests performed using PTFE films that are filled and pigmented, and that present a structure suitable for laser beam marking, in particular using an ultraviolet (UV) laser, have also revealed mechanical characteristics that are comparable.

Although the invention is described above with reference to particular embodiments, it is clear that the invention is not limited thereto in any way and variations and modifications can be applied thereto without thereby going beyond its ambit or its spirit.

What is claimed is:

1. A multilayer laminated structure, comprising:

a polyimide layer coated on at least one of its faces in FEP, and at least one layer of PTFE, said layers being constituted by tapes, said PTFE tape(s) being made of green PTFE, obtained by lubricated extrusion; and said tapes being bonded together at a temperature between a melting point of FEP and a sintering temperature of PTFE, with pressure being applied.

2. A multilayer structure according to claim 1, wherein said multilayer structure has a single PTFE tape having a width greater than the width of the FEP-coated polyimide tape.

3. A multilayer structure according to claim 2, wherein said PTFE tape projects laterally from one side only of the FEP-coated polyimide tape.

\* \* \* \* \*